(12) United States Patent
Günter

(10) Patent No.: US 6,777,053 B1
(45) Date of Patent: Aug. 17, 2004

(54) METHOD FOR PRODUCING A MULTILAYER COEXTRUDATE AND A COEXTRUDATE PRODUCED ACCORDING THERETO

(75) Inventor: Walter Günter, Forchheim (DE)

(73) Assignee: 4P Folie Forchheim Zweigniederlassung der Van Leer Deutschland GmbH & Co. KG, Forchheim (DE)

(*) Notice: Subject to any disclaimer, the term of this patent is extended or adjusted under 35 U.S.C. 154(b) by 0 days.

(21) Appl. No.: 09/831,321
(22) PCT Filed: Nov. 3, 1999
(86) PCT No.: PCT/EP99/08405
§ 371 (c)(1), (2), (4) Date: May 7, 2001
(87) PCT Pub. No.: WO00/27940
PCT Pub. Date: May 18, 2000

(30) Foreign Application Priority Data

Nov. 6, 1998 (DE) .......................... 198 51 105

(51) Int. Cl.⁷ ...................... B32B 27/00; B32B 31/00
(52) U.S. Cl. .......................... 428/40.1; 156/244.11; 156/244.23; 156/244.24; 156/247; 427/207.1; 427/208.4; 427/208.8; 428/40.9; 428/41.3; 428/41.7; 428/41.8; 428/352; 428/354
(58) Field of Search ........................ 428/40.1, 40.9, 428/41.3, 41.7, 41.8, 352, 354; 156/244.11, 244.23, 244.24, 247; 427/207.1, 208.4, 208.8

(56) References Cited

U.S. PATENT DOCUMENTS

| 4,339,485 A | | 7/1982 | Shibano et al. |
| 4,626,460 A | * | 12/1986 | Duncan ................ 428/40.1 |
| 4,867,818 A | | 9/1989 | Morgan |
| 5,605,717 A | | 2/1997 | Simmons et al. |
| 5,807,632 A | * | 9/1998 | Pedginski ................ 428/352 |

FOREIGN PATENT DOCUMENTS

| DE | 195 48 265 | 6/1997 |
| JP | 55 080479 | 6/1980 |
| JP | 59 122570 | 7/1984 |

* cited by examiner

Primary Examiner—Nasser Ahmad
(74) Attorney, Agent, or Firm—Collard & Roe, P.C.

(57) ABSTRACT

Process for the production of a multilayer coextrudate with a plastic layer that has release properties with respect to adhesives, where the materials producing the release properties are located within the plastic layer, where a first web is provided in production of the coextrudate on one side of which a layer of adhesive is located, after which the plastic layer with the release properties follows, which is in turn bonded to a second web. A multilayer coextrudate is characterized by the fact that at least two plastic films are provided, between which a layer of adhesive and a further layer that has release properties with respect to the adhesive are located.

9 Claims, 1 Drawing Sheet

METHOD FOR PRODUCING A MULTILAYER COEXTRUDATE AND A COEXTRUDATE PRODUCED ACCORDING THERETO

CROSS REFERENCE TO RELATED APPLICATIONS

Applicant claims priority under 35 U.S.C. §119 of German Application No. 198 51 105.1 filed Nov. 6, 1998. Applicant also claims priority under 35 U.S.C. §365 of PCT/EP99/08405 filed Nov. 3, 1999. The international application under PCT article 21 (2) was not published in English.

BACKGROUND OF THE INVENTION

Field of the Invention

The invention relates to a process for the production of a multilayer coextrudate with a plastic layer that has release properties with respect to adhesives, where the materials producing the release properties are located within the plastic layer.

SUMMARY OF THE INVENTION

The purpose of the invention is to indicate a process of the kind outlined above with which a composite material consisting of a web, an adhesive, a release layer and a further web for the release layer can be produced in an efficient way.

In the solution to this problem proposed by the invention, a first web is provided in production of the coextrudate on one side of which a layer of adhesive is located, after which the plastic layer with the release properties follows, which is in turn bonded to a second web.

At least the basic structure of the composite material is produced in a single operation by this coextrusion process.

It has proved to be particularly favourable in this context if in accordance with a further development of the invention the layers of the coextrudate are coextruded simultaneously.

Particularly efficient production of the entire layer structure is achieved as a result.

In a particularly advantageous development of the invention, the layers are extruded simultaneously by the blown film process.

It is, however, also possible in accordance with a further development of the invention that the layers are produced by the cast film process.

In accordance with a further advantageous development of the invention, it is possible that a substrate web, to which the other layers are extruded in a single process operation, is provided as the first or second web.

This process is particularly favourable especially when a web is being used that is difficult or impossible to extrude at the same time, as all the other layers can be applied to the web that is acting as the substrate web in a single operation.

It is also very advantageous if in accordance with a further development of the invention a plastic film, to which the other layers are extruded in a single process operation, is provided as the substrate web.

A further advantageous development of the invention is characterised by the fact that at least the substrate web is oriented.

The coextrudate receives favourable strength properties as a result.

It is also possible in accordance with an advantageous development of the invention that the entire coextrudate is oriented.

All the layers that can be oriented can help to increase the strength properties in this case.

In accordance with an advantageous development of the invention, a multilayer coextrudate has at least two plastic films, between which a layer of adhesive and a further layer that has release properties with respect to the adhesive are located.

In a further advantageous development of the invention, further layers are provided that are located on either or both sides of the plastic films. Thus both elastic films are each provided with a further layer bonded to the plastic films.

It has proved to be very advantageous if in accordance with a further development of the invention at least part of the coextrudate structure is oriented.

Considerable increases in strength are achieved by orienting the substrate web or the finished coextrudate.

Figure 1:
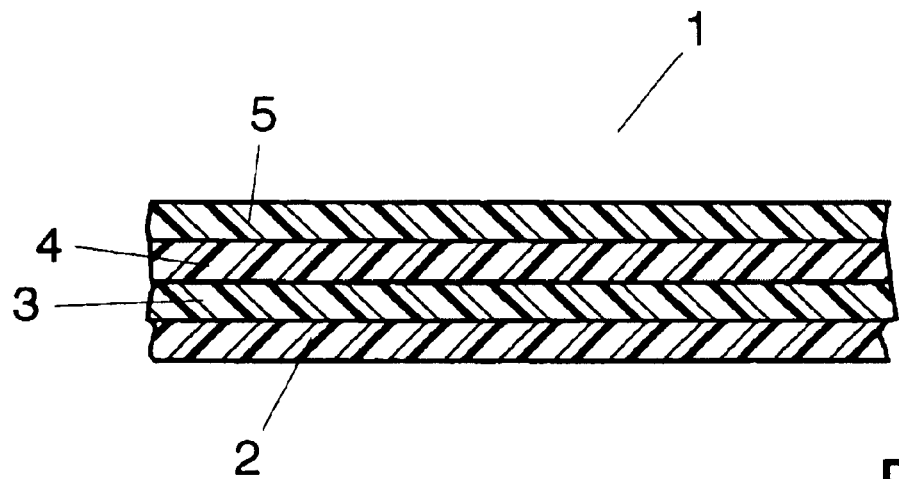
FIG. 1 is a diagrammatic view of the structure of a composite material that consists of four layers and FIG. 2 shows a further composite material consisting of five layers, again in a diagrammatic view.

DETAILED DESCRIPTION OF PREFERRED EMBODIMENTS 1 in FIG. 1 is a composite material that consists of four layers and has been produced by the coextrusion process. A layer of adhesive 3, next to which a further layer 4 that has release properties with respect to the adhesive is located, is provided on one side of a first web 2. This release layer 4 is in turn bonded to a second web 5. If both of the webs 2 and 5 are made from a coextrudable plastic, all four layers can be produced simultaneously, not only by the blown film process but also by the cast film process. It is, however, also possible to coat the web 2 or the web 5 with the other layers subsequently by the coextrusion process.

Figure 2:
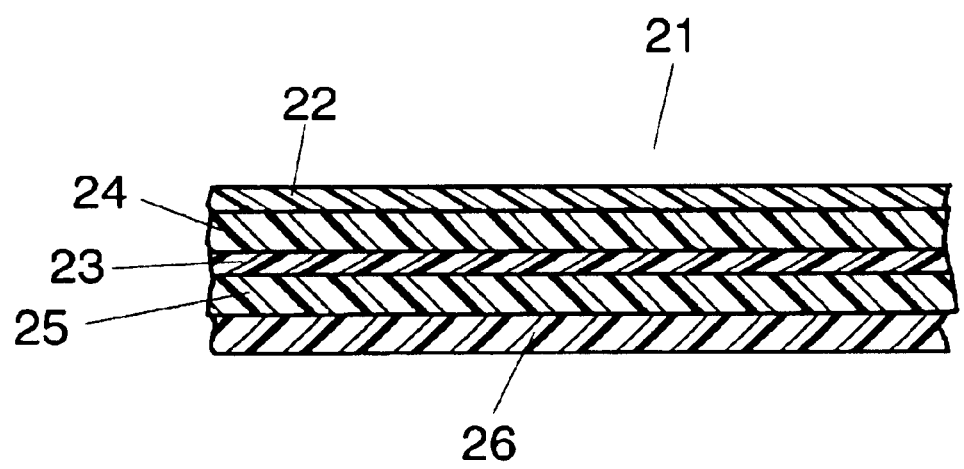

FIG. 2 shows a further composite material 21 that consists of five layers. What is involved here is a web 22 that acts as the substrate layer for a release layer 24. This release layer 24 faces a layer of adhesive 23 that is bonded to a web 25 made of plastic. This web 25, which acts as the core layer, has a surface layer 26 on its side facing away from the layer of adhesive 23. Such a surface layer can also be provided on the web 22 that acts as the substrate layer for the release layer.

Different plastics can be used as the substrate layer for the release layer.

Good properties have, for example, been achieved with LDPE, LLDPE, HDPE, PP, mPE, PETP and PS, in each case 20 to 40 $\mu$ thick, while the actual release layer was 5 to 10 $\mu$ thick.

PP, OPP, PE, LDPE, LLDPE, mPE, PS and PET have been used very successfully for the web that supports the adhesive, with material thicknesses between 60 and 200 $\mu$, depending on the material used. This web has in some cases been provided with an additional coating on the outside to improve printability.

The webs have in some cases been divided up into several individual layers made from different materials too.

Extrudable, permanently tacky adhesives based on hot-melts and polyolefins with appropriate tackifying additives have been used successfully as adhesives.

EXAMPLE 1

Use of SIS, SBS, SEBS and SEP block copolymers with melt indices of between 8 and 65 g/10 min at 200° C. and 5 kg. The styrene content of the polymers varies between 10 and 35%. The properties of the adhesive layer are controlled by the addition of resins and plasticisers, e.g. by means of aliphatic hydrocarbon resins, polyterpene resins, hydrolysed hydrocarbon resins, aromatic hydrocarbon resins, paraffin waxes, microcrystalline waxes, polyisobutylene and process oils.

Liquid components are processed into an extrudable formn by carrying out a compounding operation first. The extrusion temperatures vary between 100 and 240° C., avoiding excessively high shear forces at the same time.

EXAMPLE 2

Another way to produce the adhesive layer involves the inclusion of UV acrylates or UV-curing PSAs between the coextruded substrate and release layers by using melt transport technology.

The radiation-cured basic materials are, for example, acrylate copolymers with an integrated photoinitiator. UV cross-linking is carried out by the polymer substrate layer for the adhesive.

The acrylate copolymers can be modified by resins and plasticisers, while the tack of the adhesive layer can be regulated via the radiation dose.

Typical radiation wavelengths for cross-linking purposes are in the range between 250 and 260 nm (UVC).

Typical processing temperatures for the acrylate copolymers are between 110 and 150° C.

If a substrate web is used that is coated by the coextrusion process, it is possible to orient not only the substrate web alone but also the finished coextrudate in order to increase the strength properties.

If the entire structure is produced as a coextrudate, this coextrudate can also be oriented subsequently to increase the strength properties.

LDPE=low density polyethylene
LLDPE=linear low density polyethylene
HDPE=high density polyethylene
mPE=metallocene catalyzed polyethylene
PET=polyethylene terephthalate
PETP=polyethylene terphthalate polymer
PP=polypropylene
OPP=oriented polypropylene
PS=polystyrene
SIS=styrene isoprene styrene
SBS=styrene butadiene styrene
SEBS=styrene ethylene butadiene styrene
PSA=pressure sensitive adhesive
SEP=styrene ethylene propylene
UV=ultra violet
UVC=ultra violet curing

What is claimed is:

1. Process for the production of a multilayer coextrudate with a plastic layer that has release properties with respect to adhesives, comprising locating materials producing the release properties within the plastic layer, wherein a first plastic web film (2, 22) is provided in production of the coextrudate on one side of which a layer of adhesive (3, 23) is located, after which the plastic layer (4, 24) with the release properties follows, which is in turn bonded to a second plastic web film (5, 25); and wherein the layers of the coextrudate are coextruded simultaneously; and wherein further layers (26) are provided that are located on and bonded to both sides of the plastic web films (2, 5 or 22, 25), such that both plastic web films are each provided with a further layer (26) bonded to the plastic films.

2. Process according to claim 1, wherein the layers are extruded simultaneously by the blown film process.

3. Process according to claim 1, wherein the layers are produced by the cast film process.

4. Process according to claim wherein a substrate web (2,5; 22,25), to which the other layers are extruded in a single process operation, is provided as the first or second web.

5. Process according to claim 1, wherein a plastic film, to which the other layers are extruded in a single process operation, is provided as the substrate web (2, 5; 22, 25).

6. Process according to claim 1, wherein at least the substrate web is oriented.

7. Process according to claim 6, wherein the entire coextrudate is oriented.

8. Multilayer coextrudate produced in accordance with the process as described in claim 1, wherein at least two plastic web films (2, 5; 22, 25) are provided, between which a layer of adhesive (3, 23) and a further layer (4, 24) that has release properties with respect to the adhesive are located.

9. Multilayer coextrudate according to claim 8, wherein at least part of the coextrudate structure is oriented.

* * * * *

UNITED STATES PATENT AND TRADEMARK OFFICE
CERTIFICATE OF CORRECTION

PATENT NO. : 6,777,053 B1
DATED : August 17, 2004
INVENTOR(S) : Günter

It is certified that error appears in the above-identified patent and that said Letters Patent is hereby corrected as shown below:

<u>Title page</u>,
Item [73], Assignee, please change "4P Folie Forchheim Zweivgniederlassung der Van Leer Deutschland GmbH & Co. KG" to correctly read:
-- 4P Folie Forchheim Zweigniederlassung der Huhtamaki Van Leer Deutschland GmbH & Co. KG --.

Signed and Sealed this

Seventh Day of December, 2004

JON W. DUDAS
*Director of the United States Patent and Trademark Office*